No. 730,509. Patented June 9, 1903.

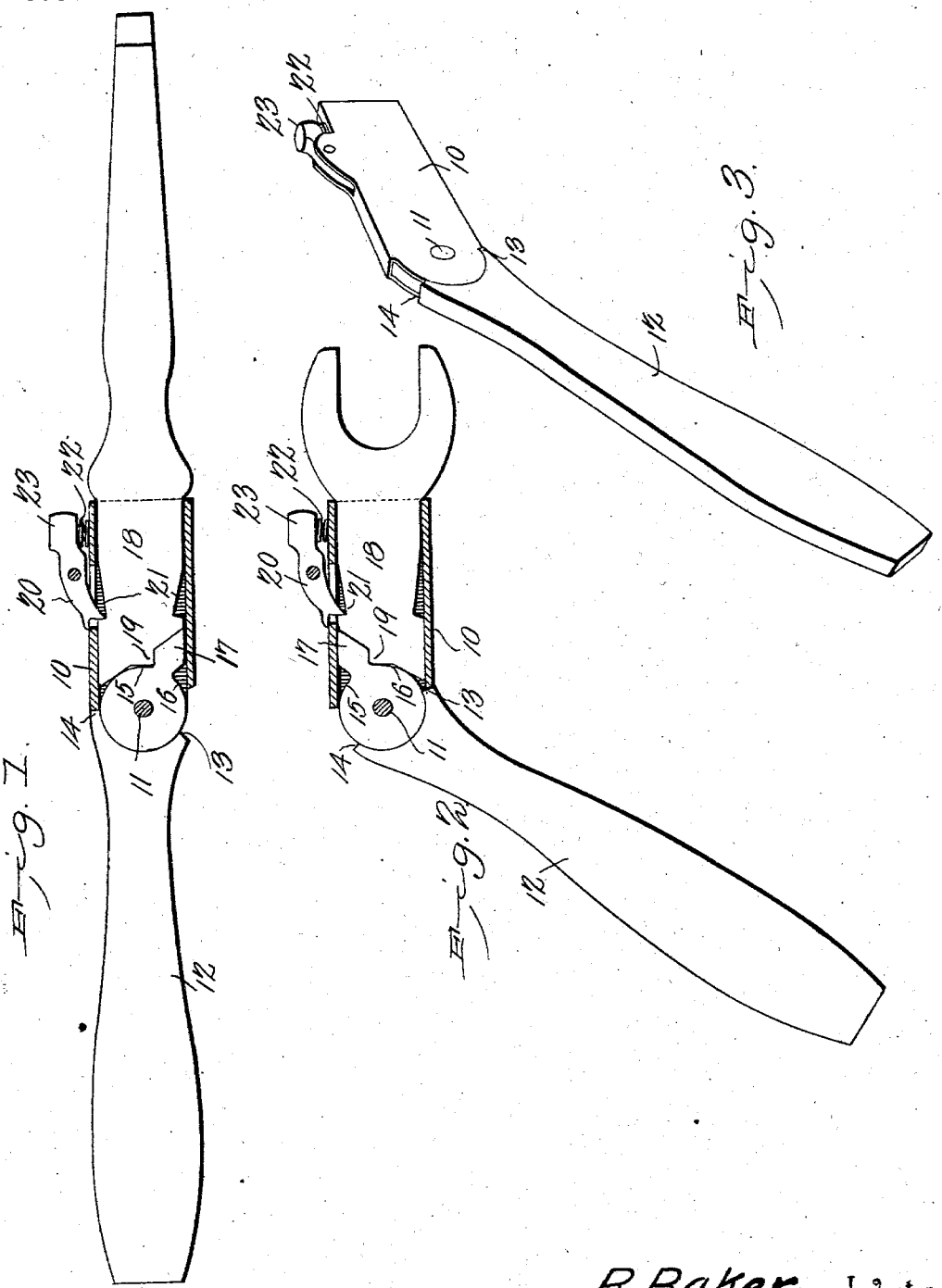

UNITED STATES PATENT OFFICE.

RILEY BAKER, OF OTISCO, INDIANA, ASSIGNOR OF ONE-HALF TO ARTHUR O. DAILEY, OF ST. LOUIS, MISSOURI.

ADJUSTABLE IMPLEMENT-HOLDER.

SPECIFICATION forming part of Letters Patent No. 730,509, dated June 9, 1903.

Application filed December 30, 1902. Serial No. 137,181. (No model.)

*To all whom it may concern:*

Be it known that I, RILEY BAKER, a citizen of the United States, residing at Otisco, in the county of Clark and State of Indiana, have invented a new and useful Adjustable Implement-Holder, of which the following is a specification.

This invention relates to devices employed for holding implements of various kinds, and has for its object the production of a simply-constructed and easily operated and applied device whereby the handle member may be supported in alinement with or at an angle to the supporting means and implement and firmly locked in either one of its positions; and the invention consists in certain novel features of the construction, as hereinafter shown and described, and specified in the claims.

In the drawings illustrative of the invention, in which corresponding parts are denoted by like characters in all the figures, Figure 1 is a sectional side elevation with the handle member disposed in alinement with the implement being held, and Fig. 2 is a similar view with the handle member supported at an angle to the implement being held. Fig. 3 is a perspective view of the device without the implement.

The device may be employed for supporting implements of various kinds—such as screwdrivers, wrenches of various forms, hammerheads, and the like—and for the purpose of illustration the device is shown supporting a screw-driver in Fig. 1 and an ordinary jaw-wrench in Fig. 2; but it is obvious that a large variety of different forms of implements may be supported in the device, and I do not, therefore, wish to be limited to any specific implement or tool in connection therewith, but reserve the right to the employment of the device for supporting any form of implement to which it is adapted.

The improved device consists in a socket member 10, preferably of a flat tubular shape, as indicated in Fig. 3, open at both ends, and with one end rounded, as shown, and provided with a transverse pivot-pin 11.

Movably supported upon the pivot-pin 11 is a handle member 12, provided with stops 13 14, the stop 14 permitting the handle member to be turned into longitudinal alinement with the socket member, as shown in Fig. 1, and the stop or shoulder 13 permitting the handle member to be turned at an angle to the socket member, as shown in Figs. 2 and 3, the shoulder 13 limiting the movement of the handle member relative to the socket member, as will be obvious. Upon its inner end the handle member will be provided with spaced recesses 15 16, the recess 15 coming centrally of the interior of the socket member when the handle member is in alinement therewith, as shown in Fig. 1, and the recess 16 coming centrally of the socket member when the handle member is turned at an angle, as shown in Figs. 2 and 3. Between the recesses 15 16 the handle member is extended into an arrow-pointed projection 17, this projection adapted to alternately engage the interior of the socket member upon opposite sides when the handle member is placed in its two positions, as indicated in Figs. 1 and 2, the projection thus forming an extended stop to limit the movement of the handle member and assist in supporting it in position, and relieving the strains to which the shoulders 13 14 would otherwise be subjected.

The implement to be held in the socket member will be provided with a shank portion 18, this portion of the implement being the same in all, as indicated in Figs. 1 and 2. The shank portions 18 will each be provided with a central projection 19 and inclined upon each side of the projection, as shown, the projection 19 adapted to alternately engage the recesses 15 16, according as to which position the shank occupies in the socket 10. Thus it will be obvious that when the handle member 12 is turned into position in longitudinal alinement with the socket member and the implement being held therein the projection 19 will engage the recess 15 and firmly support the handle member in its alined position, and then when the handle member is turned its angular position, as shown in Fig. 2, and the implement reversed the projection 19 will engage the other recess 16 and firmly support the handle member in its angular position relative to the socket member. By this simple means the implement to be held becomes the means for locking the handle member into either one of its two positions, and to complete the action the socket member will be provided with means for preventing longitudinal movement between the implement and the socket member.

The locking mechanism referred to consists in a spring-controlled catch 20, adapted to engage notches 21 in the edges of the implement to be held, the notches being preferably formed in opposite sides of the socket portions 18, as shown. The catch 20 will be maintained yieldably in operative position by a spring 22 and will be provided with a knob 23, by which it may be operated exteriorly of the socket member.

The locking-notches 21 will preferably be inclined upon one side and straight upon the other, so that the socket portions may be inserted into the socket members, and will automatically engage the spring-controlled catches by their notches, as will be obvious.

In operating the device the handle member will be set to the desired position and the shank portion turned to correspond and inserted into the socket member, which action will cause the projection 19 to engage the recess 15 or 16, as the case may be, the latch 20 being at the same time displaced by the shank portion and caused to engage with whichever one of the notches 21 comes next to it.

To release the implement, it is only necessary to depress the knob 23 and withdraw the implement.

The implements may thus be very quickly and readily transferred and changed and the same handle member and socket member employed for a large variety of different implements.

This makes a very complete, convenient, and simple device, which will enable a workman to provide himself with a large number of different implements, which may be transported in a comparatively small closure in position to be very readily and quickly used when required.

The device may be constructed in any desired size to adapt it to implements of various sizes and for various purposes.

The socket member and the handle member will preferably be of steel of sufficient strength to withstand the strains to which they will be subjected, and may be modified as to shape and size without departing from the principle of the invention or sacrificing any of its advantages.

Relative sizes and forms of the inner ends of the handle members may be modified as required, and the relative adjacent portions of the shanks 18 may be likewise modified without sacrificing any of the advantages of the invention or departing from its principle, and I reserve the right to such modifications and changes as may fall within the scope of the claims.

When the implement to be supported requires the handle member to remain in one position only—such as a screw-driver, hammerhead, and the like—only one of the notches 21 will be required, as the shank portion 18 will always be inserted in one position; but when the implement requires the handle member to be adjusted to its two positions, such as some forms of wrenches, two of the notches will be required, as shown in Figs. 1 and 2, to enable the implement to be engaged by the spring-catch, no matter in which position it may be inserted into the socket member.

Having thus described the invention, what is claimed is—

1. A device of the character described consisting of a socket member, a handle member movably connect d to said socket member, the implement to be held fitting said socket member, and means operative between said handle member and implement whereby said handle member will be supported in alinement with said socket member or at an angle relative thereto, substantially as described.

2. A device of the character described consisting of a socket member, a handle member movably connected to said socket member, the implement to be held fitting said socket member, means for detachably locking said implement in said socket member, and means operative between said handle member and implement whereby said handle member may be locked into alinement with said socket member or at an angle relative thereto, substantially as described.

3. A device of the character described consisting of a socket member, a handle member movably connected to said socket member, the implement to be held reversibly fitting said socket member, and means operative between said handle member and implement, whereby said handle member will be supported in alinement with said socket member when said implement is in one position and supported at an angle relative to said socket member when said implement is in its reversed position, substantially as described.

4. A device of the character described consisting of a socket member, a handle member movably connected to said socket member and having spaced stop-recesses, the implement to be held fitting said socket member and alternately engaging said stop-recesses, whereby said handle member may be maintained in alinement with said socket member or at an angle relative thereto, substantially as described.

5. A device of the character described consisting of a socket member of substantially flat tubular shape, a handle member flattened at one end and pivotally supported between the side walls of said socket member, the implement to be held fitting said socket member, means for detachably locking said implement in said socket member and means operative between said handle member and implement whereby said handle member may be maintained in said socket member in alinement therewith or at an angle thereto, substantially as described.

6. A device of the character described consisting of a socket member of substantially flat tubular shape open at the ends, a handle member movably engaging said socket member at one end and supported between its side walls by a transverse pivot and with spaced recesses upon the handle member within said socket, the implement to be held fitting said socket member and having projections alternately engaging said spaced recesses, and means for detachably locking said implement member within said socket, substantially as described.

7. A device of the character described consisting of a socket member, a handle member movably connected to said socket member, the implement to be held having oppositely-disposed apertures, a spring-controlled catch operative through said socket member and adapted to alternately engage said apertures, and means operative between said implement and handle member whereby when said implement is in one position it will support said handle member in alinement therewith, and when in its reversed position will support said handle member at an angle relative thereto, substantially as described.

8. A device of the character described consisting of a socket member open at the ends, a handle member movably connected in one end of said socket member and provided with spaced stop-recesses within the socket member, the implement to be held reversibly fitting said socket member and provided with an intermediately-disposed projection adapted to engage one of said spaced stop-recesses when said implement is in one position and engage the other of said stop-recesses when the implement is in its reversed position, whereby said handle member will be supported in alinement with said socket member by said implement when in one position and supported at an angle relative to said socket member by said implement when in its reversed position, substantially as described.

9. In a device of the character described, a socket member, a handle member movably connected to said socket member and provided with spaced stop-recesses, the implement to be held reversibly fitting said socket member and provided with oppositely-disposed catch-recesses and with an intermediately-disposed projection adapted to engage one of said spaced stop-recesses when said implement is in one position and engage the other of said stop-recesses when the implement is in its reversed position, whereby said handle member will be supported in alinement with said socket member by said implement when in one position and supported at an angle relative to said socket member by said implement when in its reversed position, and a spring-actuated catch adapted to alternately connect with said catch-recesses to lock said implement in either of its two positions, substantially as described.

10. A device of the character described consisting of a socket member, a handle member movably connected to said socket member and having spaced stop-recesses and with an extension between said recesses adapted to alternately engage the socket member and limit the lateral movement of the handle member, the implement to be held fitting said socket member and alternately engaging said stop-recesses, substantially as described.

11. A tool-holder having a handle and a connected bit-holder capable of occupying different relative positions, and means for actuation by a bit fitted to said holder, to lock the handle and holder in a fixed relative position.

12. A tool-holder having a handle and a connected bit-holder capable of occupying different relative positions, and interchangeable bit-carried means adapted when fitted to the holder to secure the handle in a fixed position relatively thereto.

In testimony that I claim the foregoing as my own I have hereto affixed my signature in the presence of two witnesses.

RILEY BAKER.

Witnesses:
   ALLEN BAKER,
   CATHERN BAKER.